United States Patent
Cui et al.

(10) Patent No.: US 11,520,684 B2
(45) Date of Patent: Dec. 6, 2022

(54) METHOD AND APPARATUS FOR TESTING AUTONOMOUS VEHICLE, AND STORAGE MEDIUM

(71) Applicant: Apollo Intelligent Driving Technology (Beijing) Co., Ltd., Haidian District Beijing (CN)

(72) Inventors: Yue Cui, Haidian District Beijing (CN); Yaling Zhang, Haidian District Beijing (CN); Ji Tao, Haidian District Beijing (CN); Hongshun Shen, Haidian District Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 606 days.

(21) Appl. No.: 16/514,902

(22) Filed: Jul. 17, 2019

(65) Prior Publication Data

US 2020/0081822 A1    Mar. 12, 2020

(30) Foreign Application Priority Data

Sep. 7, 2018   (CN) .......................... 201811045953.4

(51) Int. Cl.
*G06F 11/36* (2006.01)
*G06F 9/451* (2018.01)
(Continued)

(52) U.S. Cl.
CPC .......... *G06F 11/3664* (2013.01); *G06F 9/451* (2018.02); *G07C 5/008* (2013.01);
(Continued)

(58) Field of Classification Search
CPC .. G06F 11/3664; G06F 9/451; G06F 3/04817; G06F 11/32; G06F 11/2242;
(Continued)

(56) References Cited

U.S. PATENT DOCUMENTS 9,858,621 B1 *   1/2018  Konrardy ............... G06Q 40/08
10,089,693 B1 * 10/2018  Konrardy ......... G08G 1/096775
(Continued)

FOREIGN PATENT DOCUMENTS

CN        107097781 A      8/2017
CN        107862017 A      3/2018
(Continued)

OTHER PUBLICATIONS

First Office Action of the parallel JP application; 3 pages.
(Continued)

*Primary Examiner* — Muhammad Shafi
(74) *Attorney, Agent, or Firm* — Tucker Ellis LLP

(57) ABSTRACT

The application provides a method and an apparatus for testing an autonomous vehicle, and a storage medium, where the method includes: obtaining detection information of the autonomous vehicle, where the detection information is configured to indicate the test result obtained when the detecting apparatus in the autonomous vehicle tests the autonomous vehicle; further, generating a test interface according to the obtained detection information, and displaying the test interface, so that the tester can visually check various test information of the autonomous vehicle during the road running test, thereby not only saving a labor cost, but also improving a test efficiency of the road running test.

13 Claims, 3 Drawing Sheets

(51) Int. Cl.
  *G07C 5/00*    (2006.01)
  *G07C 5/06*    (2006.01)
  *G07C 5/12*    (2006.01)
  *G06F 3/04817* (2022.01)

(52) U.S. Cl.
  CPC .................. *G07C 5/06* (2013.01); *G07C 5/12* (2013.01); *G06F 3/04817* (2013.01)

(58) Field of Classification Search
  CPC ............ G07C 5/008; G07C 5/06; G07C 5/12; G01M 17/007; G05D 1/0055
  USPC ........................................................ 701/31.4
  See application file for complete search history.

(56) References Cited

U.S. PATENT DOCUMENTS

| | | | |
|---|---|---|---|
| 10,599,546 B1 * | 3/2020 | Walther | G06F 30/20 |
| 10,909,629 B1 * | 2/2021 | Madigan | G06F 11/3476 |
| 2015/0170287 A1 * | 6/2015 | Tirone | G06Q 40/08 |
| | | | 705/4 |
| 2018/0237027 A1 | 8/2018 | Lundsgaard | |

FOREIGN PATENT DOCUMENTS

| | | | |
|---|---|---|---|
| CN | 108255151 A | | 7/2018 |
| CN | 2018-10182029 | * | 8/2018 |
| CN | 108363985 A | * | 8/2018 |
| CN | 108363985 A | | 8/2018 |
| CN | 108375775 A | | 8/2018 |
| EP | 2950075 A1 | | 2/2015 |
| JP | 2015184243 A | | 10/2015 |

OTHER PUBLICATIONS

First Office Action of the priority No. 201811045953.4 dated Jan. 10, 2020; 6 pages.

European Search report regarding Application No. 19187110.2-1224 dated Jan. 20, 2017; 10 pages.

* cited by examiner

METHOD AND APPARATUS FOR TESTING AUTONOMOUS VEHICLE, AND STORAGE MEDIUM

CROSS-REFERENCE TO RELATED APPLICATION

This application claims the benefit of Chinese Patent Application No. 201811045953.4, entitled "Method and Apparatus for Testing Autonomous Vehicle, and Storage Medium," filed Sep. 7, 2018, which application is incorporated in its entirety here by this reference.

TECHNICAL FIELD

The present disclosure relates to the field of automatic driving technologies, and in particular, to a method and an apparatus for testing an autonomous vehicle, and a storage medium.

BACKGROUND

With the development of information technology, more and more research on intelligent vehicles are conducted. Autonomous vehicles are the main research direction of the intelligent vehicle research. In the research of autonomous vehicle technology, road running tests are usually required for autonomous vehicles to test various devices in the autonomous vehicles.

In prior art, multiple professional testers are required to sequentially check the underlying code in the autonomous vehicle, and then each tester manually tests devices in his charge.

However, in the prior art, the existing road running test requires a large number of professional testers and consumes vast amounts of manpower for testing, thus leading to a low testing efficiency of the road running test and a high labor cost.

SUMMARY

The disclosure provides a method and an apparatus for testing an autonomous vehicle, and a storage medium which improve the test efficiency of the road running test.

In a first aspect, the present application provides a method for testing an autonomous vehicle, including:

obtaining detection information of the autonomous vehicle, where the detection information is used to indicate the test result obtained when the detecting apparatus in the autonomous vehicle tests the autonomous vehicle; and generating a test interface according to the detection information and displaying the test interface.

In a possible implementation, the test interface includes at least one of the following: a vehicle environment display interface, a monitoring warning display interface, a debugging problem recording interface, and a path display interface;

where the vehicle environment display interface is configured to display the surrounding environment of the autonomous vehicle during the test; the monitoring warning display interface is configured to display the warning information of the autonomous vehicle during the test; the debugging problem recording interface is configured to display and record the debugging problem information of the autonomous vehicle during the test; the path display interface is configured to display the path information of the autonomous vehicle during the test.

In a possible implementation, the detection information includes at least one of the following: first information collected by a laser detecting apparatus, second information collected by an image capturing apparatus, and third information collected by a radar sensing apparatus;

where the generating the test interface according to the detection information and displaying the test interface includes:

generating the vehicle environment display interface according to one or more of the first information, the second information, and the third information and displaying the vehicle environment display interface.

In a possible implementation, the detection information includes at least one of the following: second information collected by an image capturing apparatus, third information collected by a radar sensing apparatus, and fourth information collected by a state sensing apparatus for each device in the autonomous vehicle;

where the generating a test interface according to the detection information and displaying the test interface includes:

generating the monitoring warning display interface according to one or more of the second information, the third information, and the fourth information and displaying the monitoring warning display interface.

In a possible implementation, the detection information includes fifth information detected by the information inputting apparatus;

where the generating the test interface according to the detection information and displaying the test interface includes:

generating the debugging problem recording interface according to the fifth information and displaying the debugging problem recording interface.

In a possible implementation, the detection information includes sixth information detected by a position sensing apparatus;

where the generating the test interface according to the detection information, and displaying the test interface includes:

generating the path display interface according to the sixth information and preset map information and displaying the path display interface.

In a possible implementation, the method further includes:

sending the detection information to a server, so that the server generates and displays the test interface based on the detection information.

In a possible implementation, the obtaining the detection information of the autonomous vehicle includes:

receiving the detection information sent by an in-vehicle client.

In a second aspect, the present application provides an apparatus for testing an autonomous vehicle, including:

an obtaining module, configured to obtain detection information of the autonomous vehicle, where the detection information is used to indicate the test result obtained when the detecting apparatus in the autonomous vehicle tests the autonomous vehicle;

a generating module, configured to generate a test interface according to the detection information; and a displaying module, configured to display the test interface.

In a possible implementation, the test interface includes at least one of the following: a vehicle environment display interface, a monitoring warning display interface, a debugging problem recording interface, and a path display interface;

where the vehicle environment display interface is configured to display the surrounding environment of the autonomous vehicle during the test; the monitoring warning display interface is configured to display the warning information of the autonomous vehicle during the test; the debugging problem recording interface is configured to display and record the debugging problem information of the autonomous vehicle during the test; the path display interface is configured to display the path information of the autonomous vehicle during the test.

In a possible implementation, the detection information includes at least one of the following: first information collected by a laser detecting apparatus, second information collected by an image capturing apparatus, and third information collected by a radar sensing apparatus;

the generating module is specifically configured to: generate the vehicle environment display interface according to one or more of the first information, the second information, and the third information;

the displaying module is specifically configured to: display the vehicle environment display interface.

In a possible implementation, the detection information includes at least one of the following: second information collected by an image capturing apparatus, third information collected by a radar sensing apparatus, and fourth information collected by a state sensing apparatus for each device in the autonomous vehicle;

the generating module is specifically configured to: generate the monitoring warning display interface according to one or more of the second information, the third information, and the fourth information; and the displaying module is specifically configured to: display the monitoring warning display interface.

In a possible implementation, the detection information includes fifth information detected by the information inputting apparatus;

the generating module is specifically configured to: generate the debugging problem recording interface according to the fifth information; and the displaying module is specifically configured to: display the debugging problem recording interface.

In a possible implementation, the detection information includes sixth information detected by a position sensing apparatus;

the generating module is specifically configured to: generate the path display interface according to the sixth information and a preset map information; and the displaying module is specifically configured to: display the path display interface.

In a possible implementation, the apparatus further includes:

a sending module, configured to send the detection information to a server, so that the server generates and displays the test interface according to the detection information.

In a possible implementation, the obtaining module is specifically configured to: receive the detection information sent by an in-vehicle client.

In a third aspect, the present application provides an apparatus for testing an autonomous vehicle, including: a memory and a processor;

where the memory is configured to store computer instructions; and the processor is configured to run the computer instructions stored in the memory, in order to implement the method for testing the autonomous vehicle described in any of the implementations of the first aspect above.

In a fourth aspect, the application provides a storage medium, including: a readable storage medium and computer instructions, where the computer instructions are stored in the readable storage medium; the computer instructions are used to implement the method for testing the autonomous vehicle described in any of the implementations of the first aspect above.

According to the method and apparatus for testing the autonomous vehicle, and the storage medium provided by embodiments of the present application, the detection information of the autonomous vehicle (for indicating the test result obtained when the detecting apparatus in the autonomous vehicle tests the autonomous vehicle) is obtained; further, a test interface is generated according to the obtained detection information, and the test interface is displayed, so that the tester can visually view various test information of the autonomous vehicle during the road running test, thereby not only saving the labor cost but also improving the test efficiency of road running test.

BRIEF DESCRIPTION OF THE DRAWINGS

In order to more clearly illustrate the embodiments of the present disclosure or the technical solutions in the prior art, a brief description of the drawings used in the embodiments or the prior art description will be briefly described below. Obviously, the drawings in the following description are some embodiments of the present disclosure, and those skilled in the art can obtain other drawings according to the drawings without any inventive labor.

DETAILED DESCRIPTION OF THE EMBODIMENTS

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

First, the application scenario of the embodiment of the present application and some terms involved are explained.

Figure 1:
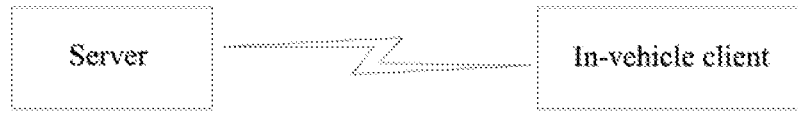
FIG. 1 shows a schematic diagram of an application scenario according to an embodiment of the present application.

FIG. 1 is a schematic diagram of an application scenario according to an embodiment of the present application. The embodiment of the present application can be applied to a road running test of an autonomous vehicle. As shown in FIG. 1, the embodiment of the present application relates to an operation of an in-vehicle client during a road running test, and/or an operation of a server during a road running test or after the road running test, to achieve an effective road running test and improve a test efficiency.

The executive subject matter of the method for testing the autonomous vehicle embodiment provided by the present application may be an in-vehicle client, an apparatus for testing an autonomous vehicle located in the in-vehicle client, a server, or an apparatus for testing an autonomous vehicle located in the server; optionally, the apparatus for testing the autonomous vehicle can be implemented by software and/or hardware.

The detecting apparatus involved in the examples of the present application may include, but is not limited to, at least one of the following: a laser detecting apparatus, an image capturing apparatus, a radar sensing apparatus, a state sensing apparatus for each device in an autonomous vehicle, an information inputting apparatus, and a position sensing apparatus.

Illustratively, the laser detecting apparatus is configured to scan respective positions of the autonomous vehicle over a preset distance (for example, 200 feet) to obtain a precise three-dimensional map of the surrounding environment of the autonomous vehicle. The image capturing apparatus is configured to collect images of obstacles such as traffic lights, sidewalks and/or bicycle lanes.

Illustratively, the radar sensing apparatus is configured to detect the position of distant obstacles.

Illustratively, the state sensing apparatus for any device in the autonomous vehicle is configured to detect operational status information of the device, such as fault information, normal operation information, and/or parameter information during operation.

Illustratively, the information inputting apparatus is configured to detect information input by the user. Optionally, the information inputting apparatus may include but is not limited to: a keyboard and/or a touch screen.

Illustratively, the position sensing apparatus is configured to detect a small displacement of the autonomous vehicle to determine a precise position where the autonomous vehicle locates in the preset map information.

The detection information involved in the embodiment of the present application is used to indicate the test result obtained when the detecting apparatus in the autonomous vehicle tests the autonomous vehicle.

The detection information involved in the examples of the present application may include, but is not limited to, at least one of the following: first information collected by the laser detecting apparatus, second information collected by the image capturing apparatus, third information collected by the radar sensing apparatus, fourth information collected by the state sensing apparatus for each device in the autonomous vehicle, fifth information detected by the information inputting apparatus, and sixth information detected by the position sensing apparatus.

The test interface involved in the embodiment of the present application is configured to display test information of the autonomous vehicle during the road running test. Optionally, the test interface may include, but is not limited to, at least one of the following: a vehicle environment display interface, a monitoring warning display interface, a debugging problem recording interface, and a path display interface.

In this case, the vehicle environment display interface is configured to display a surrounding environment of the autonomous vehicle during the test; the monitoring warning display interface is configured to display warning information of the autonomous vehicle during the test; the debugging problem recording interface is configured to display and record debugging problem information of the autonomous vehicle during the test; and the path display interface is configured to display path information of the autonomous vehicle during the test.

The preset map information involved in the embodiment of the present application refers to accurate map information preset in the autonomous vehicle, so as to determine a location of the autonomous vehicle. Illustratively, the preset map information can be updated in real time or updated every first preset time.

According to the method and apparatus for testing the autonomous vehicle and the storage medium provided by the embodiments of the present application, the test interface is generated according to the detection information and the test interface is displayed, so that the tester can visually view various test information of the autonomous vehicle during the road running test, thereby not only saving the labor cost, but also improving the test efficiency of the road running test.

In the following, the technical solutions of the present application and how the technical solutions of the present application solve the above technical problem will be described in detail with reference to specific embodiments. The following specific embodiments may be combined with each other, and the same or similar concepts or processes may not be described in some embodiments.

Figure 2A:
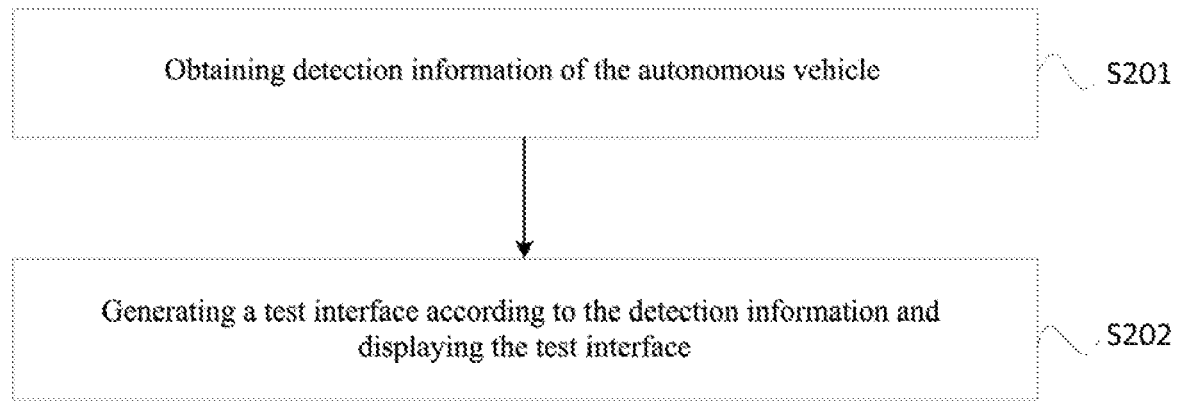
FIG. 2A shows a schematic flowchart of a method for testing an autonomous vehicle according to an embodiment of the present application.

FIG. 2A is a schematic flowchart of a method for testing an autonomous vehicle according to an embodiment of the present application. As shown in FIG. 2A, the method for testing the autonomous vehicle provided in this embodiment may include:

step S201, obtaining detection information of the autonomous vehicle.

In this step, the detection information of the autonomous vehicle is obtained, where the detection information is used to indicate the test result obtained when the detecting apparatus in the autonomous vehicle tests the autonomous vehicle.

Illustratively, the detecting apparatus involved in the examples of the present application may include, but is not limited to, at least one of the following: a laser detecting apparatus, an image capturing apparatus, a radar sensing apparatus, a state sensing apparatus for each device in an autonomous vehicle, an information inputting apparatus, and a position sensing apparatus.

Illustratively, if the detecting apparatus includes the laser detecting apparatus, the image capturing apparatus and the radar sensing apparatus, then the detecting information may include at least one of the following: the first information collected by the laser detecting apparatus, the second information captured by the image capturing apparatus and the third information collected by the radar sensing apparatus.

Illustratively, if the detecting apparatus includes the image capturing apparatus, the radar sensing apparatus, and the state sensing apparatus for each device in the autonomous vehicle, then the detection information may include at least one of the following: the second information collected by the image capturing apparatus, the third information collected by the radar sensing apparatus and the fourth information collected by the state sensing apparatus for each device in the autonomous vehicle.

Illustratively, if the detecting apparatus includes the information inputting apparatus, then the detection information may include the fifth information detected by the information inputting apparatus.

Illustratively, if the detecting apparatus includes the position sensing apparatus, then the detection information may include the sixth information detected by the position sensing apparatus.

Of course, the detecting apparatus involved in the embodiment of the present application may further include other apparatuses, and/or the detection information involved in the embodiment of the present application may further include other information, which is not limited in the embodiment of the present application.

In the embodiment of the present application, the implementation manner for obtaining the detection information of the autonomous vehicle may include at least two following types:

one possible implementation manner is as follows: if the executive subject matter of the embodiment of the present application is an in-vehicle client or an apparatus for testing an autonomous vehicle located in the in-vehicle client (for the convenience of description, in the implementation manner, an example is taken for illustration where the in-vehicle client is the executive subject matter), the in-vehicle client may directly obtain the information detected by the detecting apparatus in the autonomous vehicle. Illustratively, the detecting apparatus in the autonomous vehicle may report the detected information to the in-vehicle client every second preset time period, and the detecting apparatus in the autonomous vehicle may report the detected information to the in-vehicle client in real time, or the detecting apparatus in the autonomous vehicle reports the detected information to the in-vehicle client after receiving a reporting indication message (for indicating that the detection information should be reported) sent by the in-vehicle client.

Another possible implementation manner: if the executive subject matter of the embodiment of the present application is a server or an apparatus for testing an autonomous vehicle located in the server (for the convenience of description, in this implementation manner, an example is taken for illustration where the server is an executive subject matter), the server can receive the detection information sent by an in-vehicle client, so that the server generates and displays the test interface according to the detection information. Illustratively, the server may receive the detection information sent in real time by the in-vehicle client, or the server may receive the detection information sent by the in-vehicle client after the in-vehicle client completes the road running test.

Of course, obtaining detection information of the autonomous vehicle may also be implemented in other possible implementation manners, which are not limited in the embodiments of the present application.

Step S202, generating a test interface according to the detection information and displaying the test interface.

In this step, a test interface is generated according to the obtained detection information, and the test interface is displayed, so that the tester can visually view various test information of the autonomous vehicle during the road running test.

Illustratively, the test interface may include, but is not limited to, at least one of the following: a vehicle environment display interface, a monitoring warning display interface, a debugging problem recording interface, and a path display interface;

In this case, the vehicle environment display interface is configured to display the surrounding environment of the autonomous vehicle during the test (for example, a 3D world rendering graph of the surrounding environment of the autonomous vehicle); the monitoring warning display interface is configured to display the warning information of the autonomous vehicle during the test (for example, abnormal device information and/or obstacle information, etc.); the debugging problem recording interface is configured to display and record the debugging problem information of the autonomous vehicle during the test, so that the tester can easily record and view the debugging problem information; the path display interface is configured to display the path information of the autonomous vehicle during the test, so that the tester can quickly view a route of the autonomous vehicle in the road running test.

It should be noted that when the test interface includes multiple interfaces of: the vehicle environment display interface, the monitoring warning display interface, the debugging problem recording interface, or the path display interface, the multiple interfaces may be displayed side by side on the display apparatus, or a first part of the multiple interfaces may be displayed on the display apparatus and a second part of the multiple interfaces except the first part of the interfaces are only displayed as icons on the display apparatus (when the user clicks on the icon of a certain interface, the certain interface is displayed on the display apparatus); of course, the multiple interfaces may also be displayed in other manners, which is not limited in the embodiment of the present application.

Figure 2B:
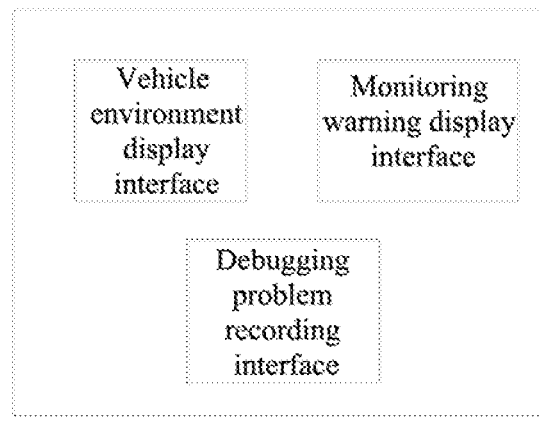
FIG. 2B shows a schematic diagram 1 of an interface provided by an embodiment of the present application.
Figure 2C:
FIG. 2C shows a schematic diagram 2 of an interface provided by an embodiment of the present application.
Figure 2C:
Figure 2C:
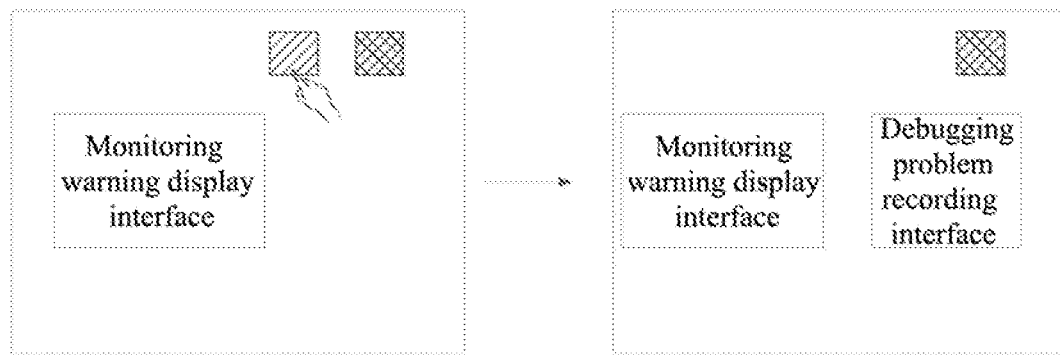

FIG. 2B is a schematic diagram 1 of an interface provided by an embodiment of the present application, and FIG. 2C is a schematic diagram 2 of an interface provided by an embodiment of the present application. It is assumed that the test interface includes: the vehicle environment display interface, the monitoring warning display interface, and the debugging problem recording interface. As shown in FIG. 2B, the vehicle environment display interface, the monitoring warning display interface, and the debugging problem recording interface may be displayed side by side on the display apparatus; or, as shown in FIG. 2C, the monitoring warning display interface is displayed on the display apparatus, while the vehicle environment display interface and the debugging problem recording interface are displayed on the display apparatus as icons; when the user clicks on the icon of the debugging problem recording interface, the debugging problem recording interface is displayed on the display apparatus, for example, the debugging problem recording interface may be displayed side by side along with the monitoring warning display interface (FIG. 2B shows the display manner of side by side as an example), or the debugging problem recording interface covers the monitoring warning display interface.

In the embodiment of the present application, the possible implementation manner for generating the test interface according to the detection information and displaying the test interface may include at least the followings:

One possible implementation manner: if the detection information includes at least one of the following: first information collected by a laser detecting apparatus, second information collected by an image capturing apparatus, and third information collected by a radar sensing apparatus; then generating the vehicle environment display interface according to one or more of the first information, the second information, and the third information and displaying the vehicle environment display interface, so that the tester can view the 3D world rendering graph of the surrounding environment of the autonomous vehicle during the test;

Another possible implementation manner: if the detection information includes at least one of the following: the second information collected by the image capturing apparatus, the third information collected by the radar sensing apparatus, and fourth information collected by a state sensing apparatus for each device in the autonomous vehicle, then generating the monitoring warning display interface according to one or more of the second information, the third information, and the fourth information and displaying the monitoring warning display interface, so that the tester can easily view the warning information of the autonomous vehicle during the test (for example, abnormal device information and/or obstacle information, etc.), so that the tester can respond in time (such as by recording and/or overhaul, etc.).

Yet another possible implementation manner: if the detection information includes fifth information detected by the information inputting apparatus, then generating the debugging problem recording interface according to the fifth information and displaying the debugging problem recording interface.

In this implementation, if the information inputting apparatus detects the fifth information (that is, the tester records the debugging problem information of the autonomous vehicle during the test through the information inputting apparatus), then generating the debugging problem recording interface according to the fifth information and displaying the debugging problem recording interface, so that tester can easily record and view the debug problem information.

Yet another possible implementation manner: the detection information includes sixth information detected by a position sensing apparatus, then generating the path display interface according to the sixth information and preset map information and displaying the path display interface.

In this implementation, according to the sixth information and the preset map information, a corresponding location of the autonomous vehicle in the preset map information can be determined (for example, located at No. XX, XXX Road, X District), and then the path display interface is generated and displayed, so that the tester can quickly view the route of the autonomous vehicle in the road running test.

It should be noted that the foregoing various possible implementations may be combined with each other, which is not described herein the embodiment of the present application.

Of course, generating the test interface according to the detection information and displaying the test interface may be implemented in other possible manners, and is not limited in the embodiment of the present application.

In the embodiment of the present application, the detection information of the autonomous vehicle (for indicating the test result obtained by the detecting apparatus in the autonomous vehicle testing the autonomous vehicle) is obtained; further, a test interface is generated according to the obtained detection information, and then displayed. Compared with the prior art where multiple professional testers are required to respectively and sequentially test the devices in his charge by checking the underlying code in the autonomous vehicle, in the embodiment of the present application, by generating the test interface according to the detection information, displaying the test interface, the labor cost is saved and the test efficiency of the road running test is also improved, so that the tester can visually view various test information of the autonomous vehicle during the road running test.

On the basis of the above examples, if the executive subject matter of the embodiment of the present application is an in-vehicle client or an apparatus for testing an autonomous vehicle located in the in-vehicle client (for the convenience of description, in the implementation manner, an example is taken for illustration where the in-vehicle client is the executive subject matter), then in the method for testing the autonomous vehicle provided by the embodiment of the present application, after obtaining the detection information of the autonomous vehicle, the in-vehicle client may also send the detection information to a server, so that the server generates the test interface and displays the test interface according to the detection information, thereby facilitating an analyst to further analyze the result of the road running test of the autonomous vehicle.

Illustratively, the in-vehicle client may send the detection information to the server in real time, or the in-vehicle client may send the detection information to the server after completing the road running test.

Figure 3:
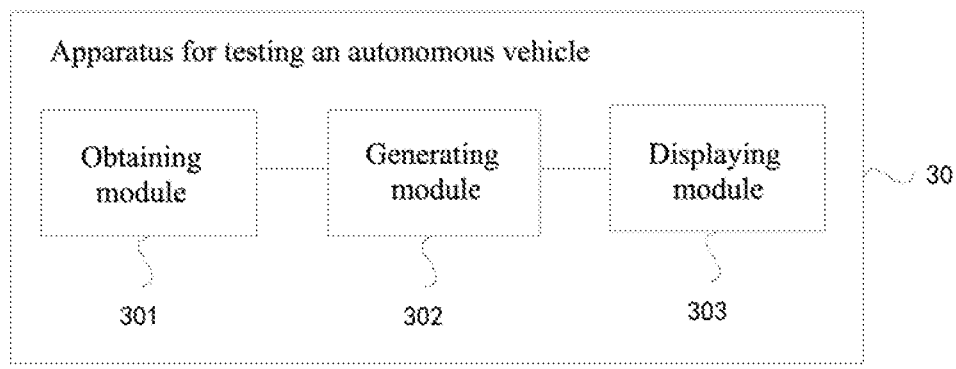
FIG. 3 shows a schematic structural diagram of an apparatus for testing an autonomous vehicle according to an embodiment of the present application.

FIG. 3 is a schematic structural diagram of an apparatus for testing an autonomous vehicle according to an embodiment of the present application. As shown in FIG. 3, the apparatus for testing the autonomous vehicle 30 provided by the embodiment of the present application may include: an obtaining module 301, a generating module 302, and a displaying module 303.

Where the obtaining module 301 is configured to obtain detection information of the autonomous vehicle, where the detection information is used to indicate the test result obtained when the detecting apparatus in the autonomous vehicle tests the autonomous vehicle;

the generating module 302 is configured to generate a test interface according to the detection information; and the display module 303 is configured to display the test interface.

In a possible implementation, the test interface includes at least one of the following: a vehicle environment display interface, a monitoring warning display interface, a debugging problem recording interface, and a path display interface;

where the vehicle environment display interface is configured to display the surrounding environment of the autonomous vehicle during the test; the monitoring warning display interface is configured to display the warning information of the autonomous vehicle during the test; the debugging problem recording interface is configured to display and record the debugging problem information of the autonomous vehicle during the test; the path display interface is configured to display the path information of the autonomous vehicle during the test.

In a possible implementation, the detection information includes at least one of the following: first information collected by a laser detecting apparatus, second information collected by an image capturing apparatus, and third information collected by a radar sensing apparatus;

the generating module 302 is specifically configured to: generate the vehicle environment display interface according to one or more of the first information, the second information, and the third information; and the displaying module 303 is specifically configured to: display the vehicle environment display interface.

In a possible implementation, the detection information includes at least one of the following: second information collected by an image capturing apparatus, third information collected by a radar sensing apparatus, and fourth information collected by a state sensing apparatus for each device in the autonomous vehicle;

the generating module 302 is specifically configured to: generate the monitoring warning display interface according to one or more of the second information, the third information, and the fourth information; and the displaying module 303 is specifically configured to: display the monitoring warning display interface.

In a possible implementation, the detection information includes fifth information detected by the information inputting apparatus;

the generating module 302 is specifically configured to: generate the debugging problem recording interface according to the fifth information; and the displaying module 303 is specifically configured to: display the debugging problem recording interface.

In a possible implementation, the detection information includes sixth information detected by a position sensing apparatus;

the generating module 302 is specifically configured to: generate the path display interface according to the sixth information and a preset map information; and the displaying module 303 is specifically configured to: display the path display interface.

In a possible implementation, the apparatus for testing the autonomous vehicle further includes:

a sending module, configured to send detection information to a server, so that the server generates and displays the test interface according to the detection information.

In a possible implementation, the obtaining module 301 is specifically configured to: receive the detection information sent by an in-vehicle client.

The apparatus for testing the autonomous vehicle provided in this embodiment is configured to implement the technical solution in the foregoing method embodiment of the present application for testing the autonomous vehicle. As the technical principles and technical effects of the apparatus for testing the autonomous vehicle and those of the foregoing method for testing the autonomous vehicle are similar, details are not described herein again.

Figure 4:
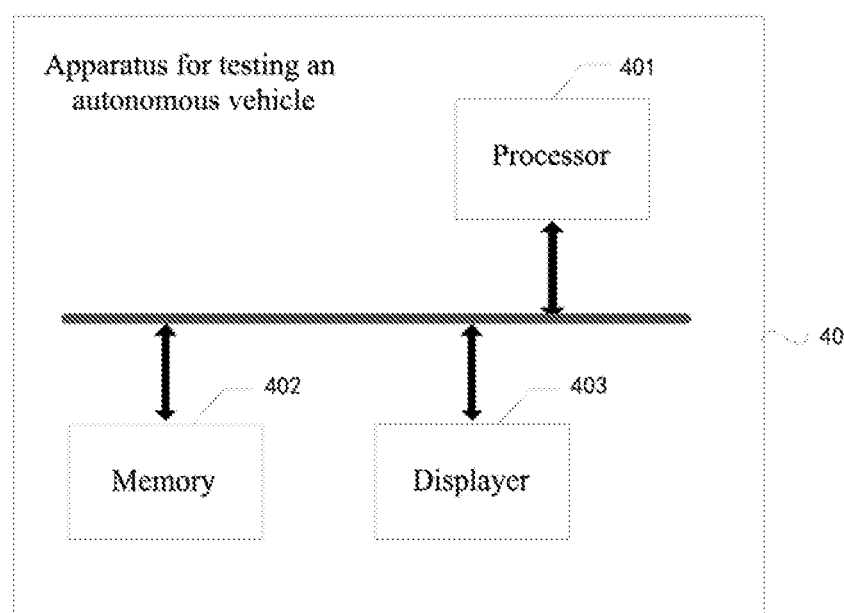
FIG. 4 shows a schematic structural diagram of an apparatus for testing an autonomous vehicle according to another embodiment of the present application.

FIG. 4 is a schematic structural diagram of an apparatus for testing an autonomous vehicle according to another embodiment of the present application. As shown in FIG. 4, the apparatus for testing the autonomous vehicle 40 provided by the embodiment of the present application may include a processor 401 and a memory 402. Optionally, the apparatus for testing the autonomous vehicle 40 may also include a displayer 403, where the memory 402 is configured to store computer instructions; the processor 401 is configured to run computer instructions stored in the memory 402 to implement the following steps:

obtaining detection information of the autonomous vehicle, where the detection information is used to indicate the test result obtained when the detecting apparatus in the autonomous vehicle tests the autonomous vehicle; and generating a test interface based on the detection information, and controlling the displayer 403 to display the test interface.

In a possible implementation, the test interface includes at least one of the following: a vehicle environment display interface, a monitoring warning display interface, a debugging problem recording interface, and a path display interface;

where the vehicle environment display interface is configured to display the surrounding environment of the autonomous vehicle during the test; the monitoring warning display interface is configured to display the warning information of the autonomous vehicle during the test; the debugging problem recording interface is configured to display and record the debugging problem information of the autonomous vehicle during the test; the path display interface is configured to display the path information of the autonomous vehicle during the test.

In a possible implementation, the detection information includes at least one of the following: first information collected by a laser detecting apparatus, second information collected by an image capturing apparatus, and third information collected by a radar sensing apparatus;

the processor 401 is specifically configured to: generate the vehicle environment display interface according to one or more of the first information, the second information, and the third information, and control the displayer 403 to display the vehicle environment display interface.

In a possible implementation, the detection information includes at least one of the following: second information collected by an image capturing apparatus, third information collected by a radar sensing apparatus, and fourth information collected by a state sensing apparatus for each device in the autonomous vehicle;

the processor 401 is specifically configured to: generate the monitoring warning display interface according to one or more of the second information, the third information, and the fourth information, and control the displayer 403 to display the monitoring warning display interface.

In a possible implementation, the detection information includes fifth information detected by the information inputting apparatus;

the processor 401 is specifically configured to: generate the debugging problem recording interface according to the fifth information, and control the displayer 403 to display the debugging problem recording interface.

In a possible implementation, the detection information includes sixth information detected by a position sensing apparatus;

the processor 401 is specifically configured to: generate the path display interface according to the sixth information and a preset map information, and control the displayer 403 to display the path display interface.

In a possible implementation, the apparatus for testing the autonomous vehicle further includes: a transceiver;

where the transceiver is configured to: send the detection information to a server, so that the server generates and displays the test interface according to the detection information.

In a possible implementation, the apparatus for testing the autonomous vehicle further includes: a transceiver;

where the transceiver is configured to receive the detection information sent by an in-vehicle client.

The apparatus for testing the autonomous vehicle provided in this embodiment is configured to implement the technical solution in the foregoing method embodiment of the present application for testing the autonomous vehicle. As the technical principles and technical effects of the apparatus for testing the autonomous vehicle and those of the foregoing method for testing the autonomous vehicle are similar, details are not described herein again.

The embodiment of the present application further provides a storage medium, including: a readable storage medium and computer instructions, where the computer instructions are stored in the readable storage medium; the computer instructions are used to implement the technical solution in the embodiment of the method for testing the autonomous vehicle of the present application. As the technical principles and technical effects of the storage medium and the method for testing the autonomous vehicle are similar, details are not described herein.

The embodiment of the present application further provides a chip for running instructions, where the chip is configured to implement the technical solution in the method embodiment of the present application for testing the autonomous vehicle. As the technical principle and technical effects of the chip and those of the method for testing the autonomous vehicle are similar, details are not described herein again.

The embodiment of the present application further provides a program product, where the program product includes a computer program, and the computer program is stored in a storage medium; at least one processor can read the computer program from the storage medium; when the at least one processor executes the computer program, the technical solution in the above method for testing the autonomous vehicle embodiment of the present application can be implemented. As the technical principle and technical effects of the program product and those of the method for testing the autonomous vehicle are similar, details are not described herein again.

It will be understood by those skilled in the art that all or part of the steps of the above method embodiments may be implemented by hardware related to the program instructions. The foregoing program may be stored in a computer readable storage medium. When the program is executed, the steps including the above method embodiments are implemented; and the foregoing storage medium includes: various media such as an ROM, an RAM, a magnetic disk, or an optical disk that can store program codes.

Finally, it should be noted that the above embodiments are only used to explain the technical solutions of the embodiments of the present disclosure, and are not limited thereto; although the embodiments of the present disclosure have been described in detail with reference to the foregoing embodiments, those skilled in the art should understand that the technical solutions described in the foregoing embodiments may be modified, or some or all of the technical features may be equivalently substituted; however, these modifications or substitutions do not make the essence of technical solution depart from the scope of the technical solutions of the embodiments of the present disclosure.

What is claimed is:

1. A method for testing an autonomous vehicle, executed by an apparatus for testing the autonomous vehicle, and the method comprising:
   a) obtaining detection information of the autonomous vehicle, wherein the detection information indicates a test result obtained when a detecting apparatus in the autonomous vehicle tests the autonomous vehicle; and
   b) generating a test interface according to the detection information, the test interface comprising a vehicle environment display interface and at least one of the following: a monitoring warning display interface, a debugging problem recording interface, and a path display interface;
   c) displaying a surrounding environment of the autonomous vehicle during the test on the vehicle environment display interface;
   d) performing at least one of:
   d1) displaying warning information of the autonomous vehicle during the test on the monitoring warning display interface;
   d2) displaying and recording debugging problem information of the autonomous vehicle during the test on the debugging problem recording interface; or
   d3) displaying path information of the autonomous vehicle during the test on the path display interface; and
   e) sending the detection information to a server, so that the server generates and displays the test interface according to the detection information.

2. The method according to claim 1, wherein the detection information comprises at least one of the following: first information collected by a laser detecting apparatus, second information collected by an image capturing apparatus, and third information collected by a radar sensing apparatus;
   wherein the generating a test interface according to the detection information and displaying the test interface comprises:
   generating the vehicle environment display interface according to one or more of the first information, the second information, and the third information and displaying the vehicle environment display interface.

3. The method according to claim 1, wherein the detection information comprises at least one of the following: second information collected by an image capturing apparatus, third information collected by a radar sensing apparatus, and fourth information collected by a state sensing apparatus for each device in the autonomous vehicle;
   wherein the generating a test interface according to the detection information and displaying the test interface comprises:
   generating the monitoring warning display interface according to one or more of the second information, the third information, and the fourth information, and displaying the monitoring warning display interface.

4. The method according to claim 1, wherein the detection information comprises fifth information detected by an information inputting apparatus;
   wherein the generating a test interface according to the detection information and displaying the test interface comprises:
   generating the debugging problem recording interface according to the fifth information and displaying the debugging problem recording interface.

5. The method according to claim 1, wherein the detection information comprises sixth information detected by a position sensing apparatus;
   wherein the generating a test interface according to the detection information and displaying the test interface comprises:
   generating the path display interface according to the sixth information and preset map information and displaying the path display interface.

6. The method according to claim 1, wherein the obtaining the detection information of the autonomous vehicle comprises: receiving the detection information sent by an in-vehicle client.

7. An apparatus for testing an autonomous vehicle, comprising: a storage medium having program instructions stored therein and a processor that;
   when executing the program instructions is configured to:
   a) obtain detection information of the autonomous vehicle, wherein the detection information indicates a test result obtained when a detecting apparatus in the autonomous vehicle tests the autonomous vehicle;
   b) generate a test interface according to the detection information, the test interface comprising a vehicle environment display interface and at least one of the following: a monitoring warning display interface, a debugging problem recording interface, or a path display interface;
c) display a surrounding environment of the autonomous vehicle during the test on the vehicle environment display interface;
d) perform at least one of:
d1) displaying warning information of the autonomous vehicle during the test on the monitoring warning display interface;
d2) displaying and recording debugging problem information of the autonomous vehicle during the test on the debugging problem recording interface; or
d3) displaying path information of the autonomous vehicle during the test on the path display interface; and
e) send the detection information to a server, so that the server generates and displays the test interface according to the detection information.

8. The apparatus according to claim 7, wherein the detection information comprises at least one of the following: first information collected by a laser detecting apparatus, second information collected by an image capturing apparatus, and third information collected by a radar sensing apparatus;
the processor is further configured to: generate the vehicle environment display interface according to one or more of the first information, the second information, and the third information; and display the vehicle environment display interface.

9. The apparatus according to claim 7, wherein the detection information comprises at least one of the following: second information collected by an image capturing apparatus, third information collected by a radar sensing apparatus, and fourth information collected by a state sensing apparatus for each device in the autonomous vehicle;
the processor is further configured to: generate the monitoring warning display interface according to one or more of the second information, the third information, and the fourth information; and display the monitoring warning display interface.

10. The apparatus according to claim 7, wherein the detection information comprises fifth information detected by an information inputting apparatus;
the processor is further configured to: generate the debugging problem recording interface according to the fifth information; and display the debugging problem recording interface.

11. The apparatus according to the claim 7, wherein the detection information comprises sixth information detected by a position sensing apparatus;
the processor is further configured to: generate the path display interface according to the sixth information and preset map information; and display the path display interface.

12. The apparatus according to claim 7, wherein the processor is further configured to: receive the detection information sent by an in-vehicle client.

13. A method for testing autonomous vehicles executed by a computer comprising a non-transitory storage medium having computer instructions stored therein and a processor executing the computer instructions, the method comprising:
a) obtaining detection information of the autonomous vehicle, wherein the detection information indicates a test result obtained when a detecting apparatus in the autonomous vehicle tests the autonomous vehicle; and
b) generating a test interface according to the detection information, the test interface comprising a vehicle environment display interface and at least one of the following: a monitoring warning display interface, a debugging problem recording interface, and a path display interface;
c) displaying a surrounding environment of the autonomous vehicle during the test on the vehicle environment display interface;
d) performing at least one of:
d1) displaying warning information of the autonomous vehicle during the test on the monitoring warning display interface;
d2) displaying and recording debugging problem information of the autonomous vehicle during the test on the debugging problem recording interface; or
d3) displaying path information of the autonomous vehicle during the test on the path display interface; and
e) sending the detection information to a server, so that the server generates and displays the test interface according to the detection information.

\* \* \* \* \*